United States Patent
Ishikawa

(10) Patent No.: US 10,382,685 B2
(45) Date of Patent: Aug. 13, 2019

(54) DRIVE DEVICE AND METHOD FOR CONTROLLING THE DRIVE DEVICE

(71) Applicant: OLYMPUS CORPORATION, Hachioji-shi, Tokyo (JP)

(72) Inventor: Takashi Ishikawa, Hachioji (JP)

(73) Assignee: OLYMPUS CORPORATION, Tokyo (JP)

( * ) Notice: Subject to any disclaimer, the term of this patent is extended or adjusted under 35 U.S.C. 154(b) by 67 days.

(21) Appl. No.: 15/829,606

(22) Filed: Dec. 1, 2017

(65) Prior Publication Data
US 2018/0205862 A1    Jul. 19, 2018

(30) Foreign Application Priority Data
Jan. 16, 2017 (JP) .................. 2017-005086

(51) Int. Cl.
| | | |
|---|---|---|
| H04N 5/232 | (2006.01) | |
| H04N 5/225 | (2006.01) | |
| H02K 41/035 | (2006.01) | |
| H02K 33/18 | (2006.01) | |
| H02K 11/215 | (2016.01) | |

(52) U.S. Cl.
CPC ........... H04N 5/2328 (2013.01); H02K 33/18 (2013.01); H02K 41/0354 (2013.01); H04N 5/2253 (2013.01); H04N 5/23287 (2013.01); H02K 11/215 (2016.01); H04N 5/23258 (2013.01)

(58) Field of Classification Search
CPC .................................. H04N 5/23248
USPC ........................... 348/208.99, 208.2
See application file for complete search history.

(56) References Cited

U.S. PATENT DOCUMENTS

| | | | |
|---|---|---|---|
| 6,285,831 B1* | 9/2001 | Hara .................. | G03B 5/00 |
| | | | 348/E5.038 |
| 2005/0206735 A1* | 9/2005 | Seo .................... | H04N 5/2254 |
| | | | 348/208.4 |
| 2014/0354860 A1* | 12/2014 | Yuge .................. | G02B 27/646 |
| | | | 348/241 |
| 2015/0146023 A1* | 5/2015 | Takeuchi ............ | G02B 27/646 |
| | | | 348/208.4 |

FOREIGN PATENT DOCUMENTS

JP        2015088956 A        5/2015

* cited by examiner

*Primary Examiner* — Anthony J Daniels
(74) *Attorney, Agent, or Firm* — Holtz, Holtz & Volek PC

(57) ABSTRACT

A drive device includes a drive controller. The drive controller controls a drive signal on which a high-frequency drive signal is superimposed on a drive current to drive a movable frame and which is to be applied to a drive coil. The drive controller drives the movable frame to a predetermined position based on a detection signal detected by a detector and a high-frequency signal of a predetermined frequency band including a frequency of the high-frequency drive signal that is generated in a detection coil when the drive signal is applied to the drive coil.

5 Claims, 17 Drawing Sheets

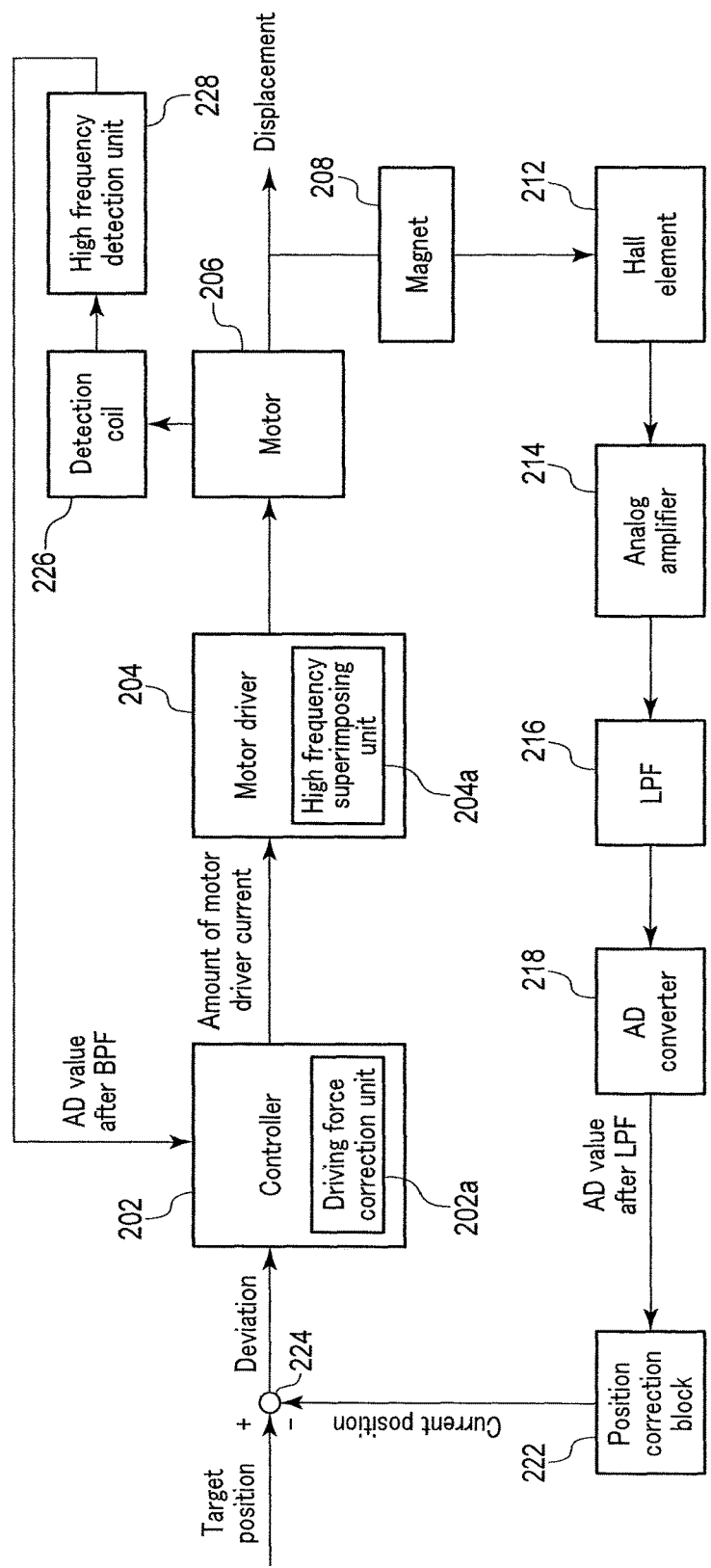
F I G. 12

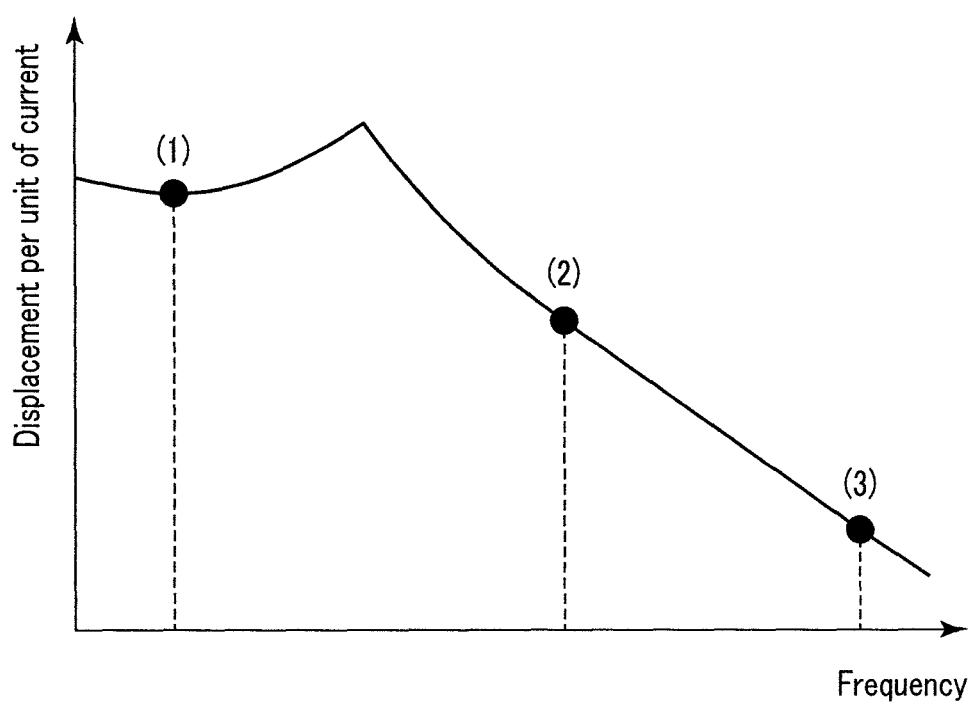
F I G. 13

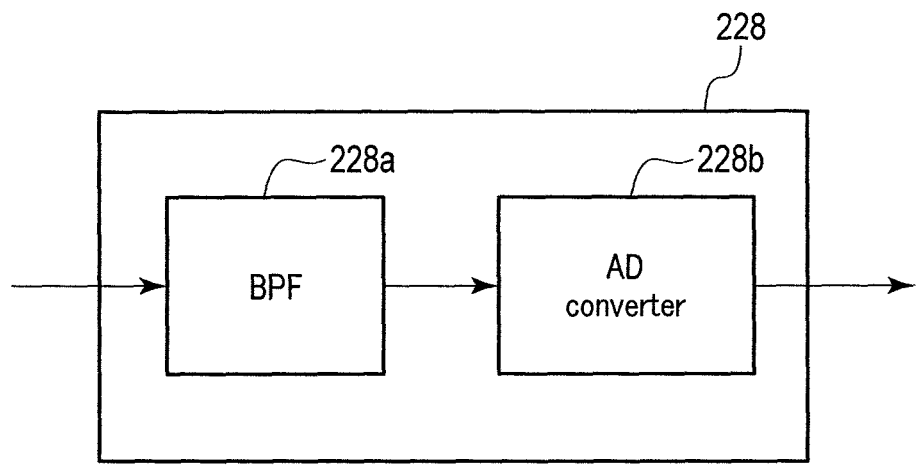
F I G. 15
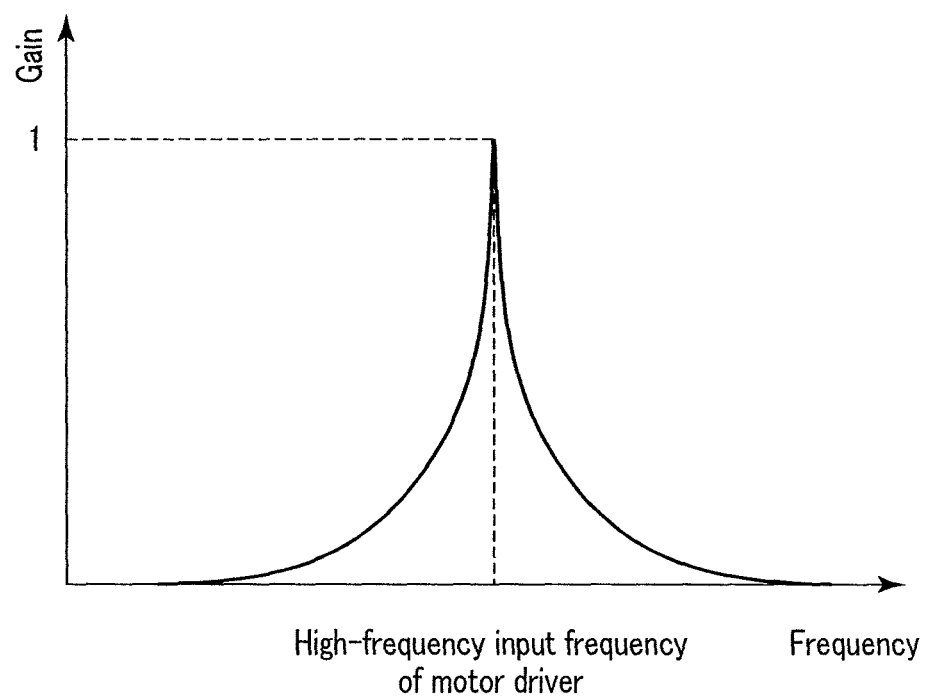
F I G. 16

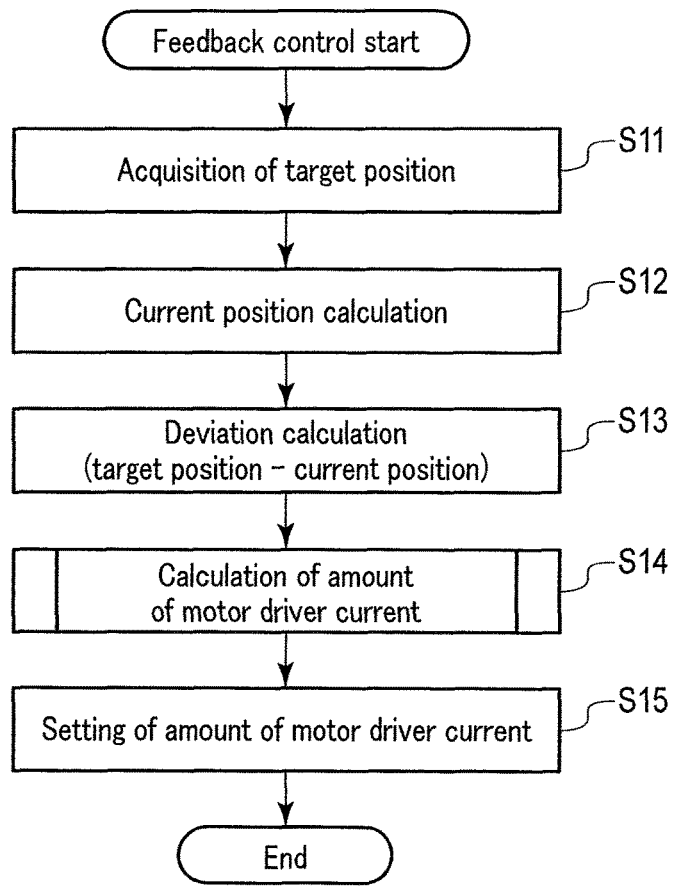
F I G. 20
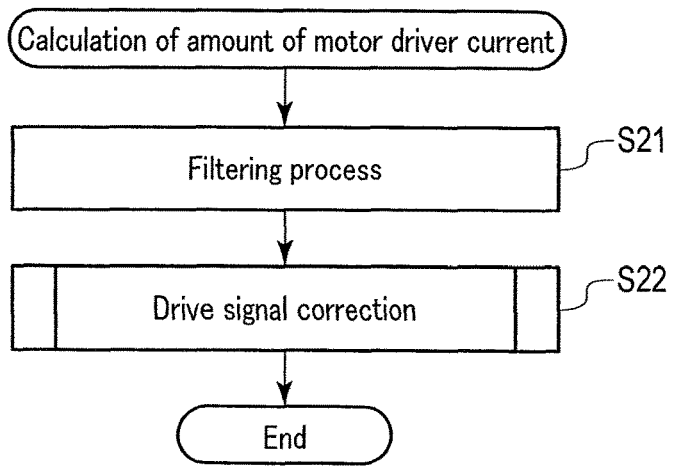
F I G. 21

DRIVE DEVICE AND METHOD FOR CONTROLLING THE DRIVE DEVICE

CROSS-REFERENCE TO RELATED APPLICATIONS

This application is based upon and claims the benefit of priority from the prior Japanese Patent Application No. 2017-005086, filed Jan. 16, 2017, the entire contents of which are incorporated herein by reference.

BACKGROUND OF THE INVENTION

1. Field of the Invention

The present invention relates to a drive device and a method for controlling the same.

2. Description of the Related Art

In digital cameras or the like, blur correction is known as a function to suppress image blurring which occurs in a video signal generated by an imaging element due to camera shake when the imaging element or a lens is moved. To perform this kind of blur correction function, a drive device is known, in which a movable frame including a lens or an imaging element is configured to be moved relative to a fixed frame by a voice coil motor (VCM) using a drive coil and a driving magnet.

In the VCM, a Hall element is used as a detector to detect a position of the movable frame relative to the fixed frame. For example, a driving magnet and another magnet, that is, a position detecting magnet are placed in the fixed frame, and a Hall element is placed in the movable frame. In this placement, a position of the movable frame relative to the fixed frame is detected based on a change of a flux from the position detecting magnet detected by the Hall element in accordance with a movement of the movable frame relative to the fixed frame.

To downsize the drive device, in some configurations like an imaging device proposed in Jpn. Pat. Appln. KOKAI Publication No. 2015-088956, a single magnet is used for both driving and position detecting, or a driving magnet and a position detecting magnet are placed in proximity.

BRIEF SUMMARY OF THE INVENTION

According to a first aspect of the invention, there is provided a drive device comprising: a fixed frame on which one of a drive coil and a magnet facing the drive coil is disposed; a movable frame on which another one of the drive coil and the magnet is disposed and which is movable relative to the fixed frame; a detector that is disposed on one of the fixed frame and the movable frame on which the drive coil is disposed, and that detects and outputs a detection signal corresponding to a magnetic flux of the magnet; a detection coil that is disposed on one of the fixed frame and the movable frame on which the magnet is disposed, and in a position facing the drive coil with the magnet interposed; and a drive controller that controls a drive signal on which a high-frequency drive signal is superimposed on a drive current to drive the movable frame and which is to be applied to the drive coil, and that drives the movable frame to a predetermined position based on the detection signal detected by the detector and a high-frequency signal of a predetermined frequency band including a frequency of the high-frequency drive signal that is generated in the detection coil when the drive signal is applied to the drive coil.

According to a second aspect of the invention, there is provided a method for controlling a drive device comprising: a fixed frame on which one of a drive coil and a magnet facing the drive coil is disposed; a movable frame on which another one of the drive coil and the magnet is disposed and which is movable relative to the fixed frame; a detector that is disposed on one of the fixed frame and the movable frame on which the drive coil is disposed, and that detects and outputs a detection signal corresponding to a magnetic flux of the magnet; and a detection coil that is disposed on one of the fixed frame and the movable frame on which the magnet is disposed, and in a position facing the drive coil with the magnet interposed, the method comprising: applying to the drive coil a drive signal on which a high-frequency drive signal is superimposed on a current that drives the movable frame; acquiring an amplitude of a predetermined frequency band including a frequency of the high-frequency drive signal from a high-frequency signal of the predetermined frequency band including the frequency of the high-frequency drive signal that is generated in the detection coil; calculating a distance-equivalent value equivalent to a distance between the detection coil and the drive coil based on the acquired amplitude; correcting the drive signal to be applied to the drive coil based on the calculated distance-equivalent value; and driving the movable frame to a predetermined position by applying the corrected drive signal to the drive coil.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 12 is a block diagram showing a configuration of a position control system of a camera shake correction unit 23 of an imaging device 1 according to the embodiment.

FIG. 13 is a diagram showing drive characteristics of a VCM in (1) a low-frequency band, (2) a mid-frequency band, and (3) a high-frequency band.

FIG. 15 is a diagram showing a configuration of an example of a high frequency detection unit.

FIG. 16 is a diagram showing a frequency characteristic of a BPF.

FIG. 20 is a flowchart of feedback control in the position control system shown in FIG. 12.

FIG. 21 is a flowchart showing a process for calculating a value of a drive current of a motor driver.

DETAILED DESCRIPTION OF THE INVENTION

Figure 1:
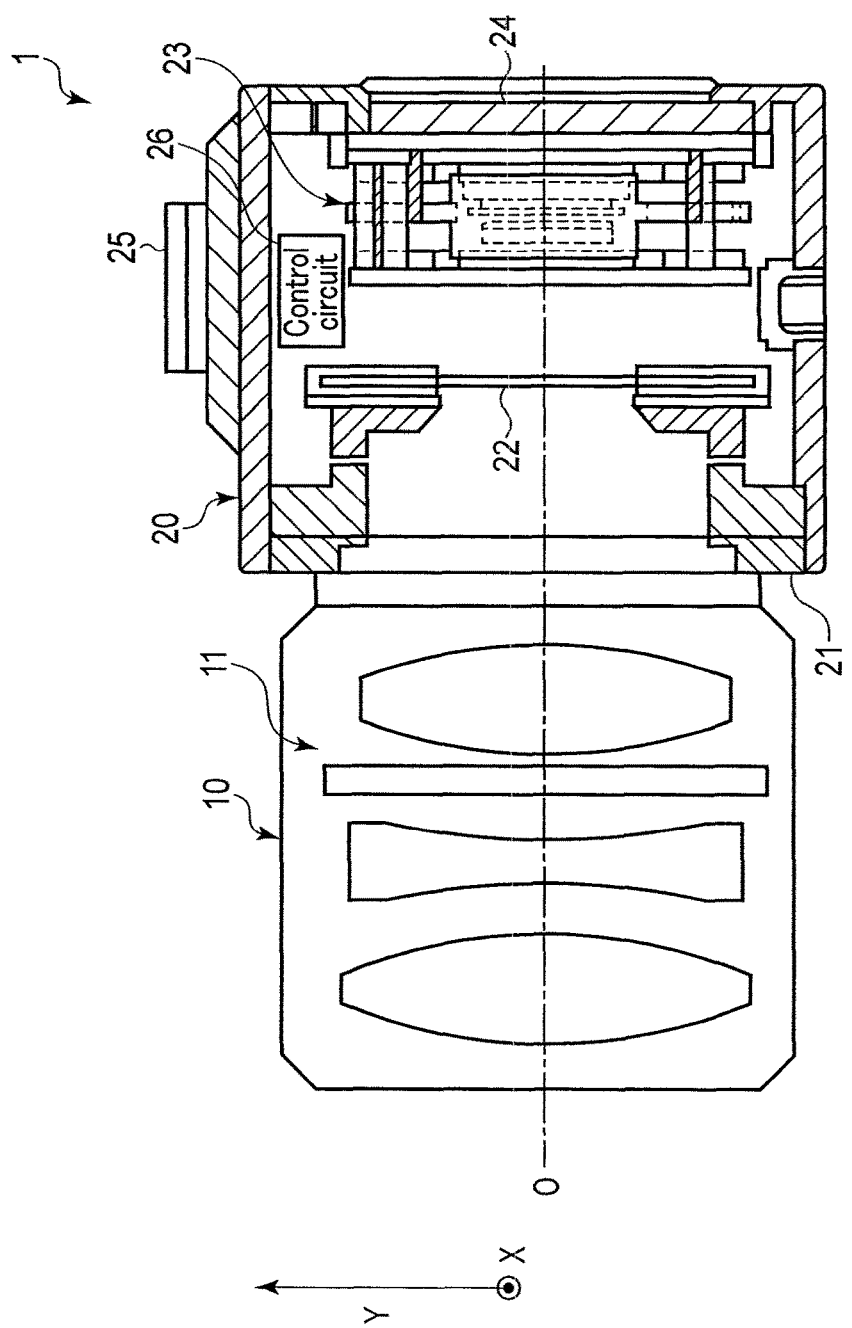
FIG. 1 is a schematic diagram showing a configuration of an imaging device according to an embodiment of the present invention.

Embodiments of the present invention will be described with reference to the accompanying drawings. FIG. 1 is a schematic diagram showing a configuration of an imaging device according to an embodiment of the present invention. The imaging device 1 shown in FIG. 1 includes an interchangeable lens 10 and a main body 20. The interchangeable lens 10 is attached to the main body 20 via a mount 21 mounted on the main body 20. The interchangeable lens 10 and the main body 20 are communicatably connected by the attachment of the interchangeable lens 10 to the main body 20. As a result, the interchangeable lens 10 and the main body 20 operate in cooperation. The imaging device 1 is not necessarily a lens-exchangeable type imaging device. For example, the imaging device 1 may be a lens-integrated type imaging device. Furthermore, the imaging device shown in FIG. 1 may be of various types of imaging devices, such as a digital camera, that includes a camera shake correction unit 23.

The interchangeable lens 10 includes an optical system 11. The optical system 11 includes, for example, a plurality of lenses and an aperture, and causes an optical beam from an object (not shown) to be incident on the camera shake correction unit 23 of the main body 20. The optical system 11 shown in FIG. 1 is comprised of a plurality of lenses; however, the optical system 11 may be comprised of one lens. The optical system 11 may include a zoom lens in addition to a focus lens. In these cases, at least a part of the lenses of the optical system 11 is freely movable in a z direction along an optical axis O.

The main body 20 includes a shutter 22, the camera shake correction unit 23, a monitor 24, an operation unit 25, and a control circuit 26.

The shutter 22 is a focal plane shutter disposed, for example, in front of the camera shake correction unit 23 (referred to as a positive side in the z direction). Opening of the shutter 22 causes the camera shake correction unit 23 to be exposed. Closure of the shutter 22 causes the camera shake correction unit 23 to be shielded from light.

The camera shake correction unit 23, as an example of the drive device, includes an imaging element and images an object (not shown) thereby to generate a video signal relating to the object. Furthermore, the camera shake correction unit 23 moves a movable frame relative to a fixed frame by a voice coil motor (VCM) using a coil and a magnet, thereby to correct an object light incident on the imaging element and to correct image blurring, which occurs in the video signal due to a camera shake or the like. Configurations of the camera shake correction unit 23 will be detailed later.

The monitor 24 is, for example, a liquid crystal display, and displays an image based on a video signal generated by the camera shake correction unit 23. The monitor 24 also displays a menu window that allows a user to perform various settings of the imaging device 1. The monitor 24 may include a touch panel.

The operation unit 25 includes, for example, a release button. The release button is a button that allows the user to provide an instruction to start imaging by the imaging device 1. The operation unit 25 includes various operation parts in addition to the release button.

The control circuit 26 includes, for example, a CPU and a memory, and controls all operations of the imaging device 1, such as an imaging operation in the imaging device 1.

Figure 2:
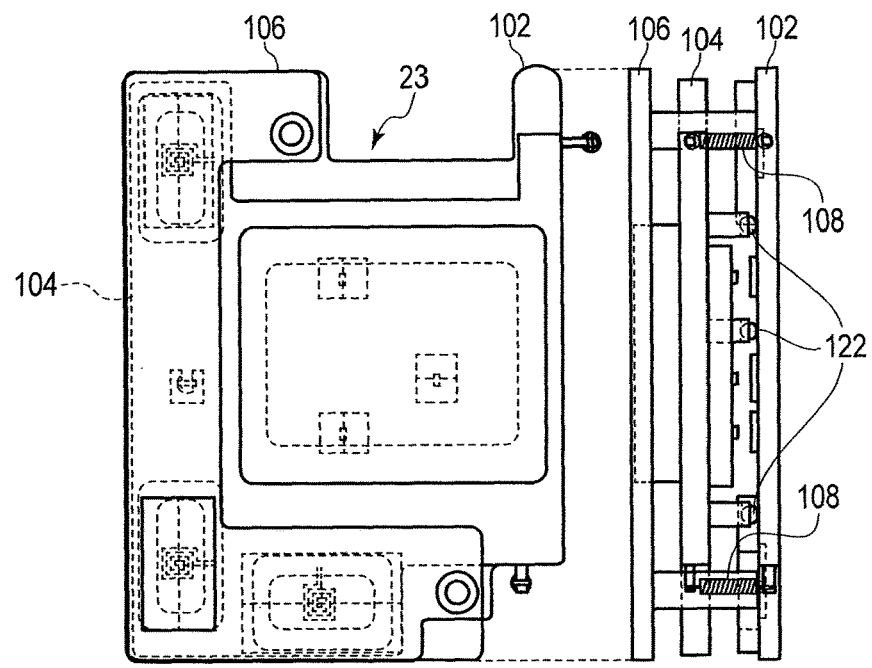
FIG. 2 is a schematic diagram showing a configuration of a camera shake correction unit as an example of a drive device according to the embodiment of the present invention.

The camera shake correction unit 23 will be further explained. FIG. 2 is a schematic diagram showing a configuration of the camera shake correction unit 23 as an example of a drive device according to the embodiment of the present invention. A left part of FIG. 2 is a front view of the camera shake correction unit 23, and a right part is a side view of the same. The camera shake correction unit 23 shown in FIG. 2 is a device to correct an object light incident on the imaging element. This is a drive device that performs blur correction drive to drive the imaging element in directions parallel to an image surface (XY directions in FIG. 1) to prevent noise from being caused in a video signal due to image blurring. In this configuration, it is assumed that the front of the camera shake correction unit 23 is a surface which faces the positive side in a Z direction in FIG. 1. Furthermore, when the camera shake correction unit 23 is placed as shown in FIG. 2, the horizontal direction is an X direction in FIG. 1, and the vertical direction is a Y direction in FIG. 1.

Broadly, the camera shake correction unit 23 shown in FIG. 2 includes a fixed frame 102, a movable frame 104, and a yoke 106. The fixed frame 102 is fixed to the main body 20 of the imaging device 1. As shown in the side view, the yoke 106 is fixed to the fixed frame 102 at a predetermined distance from the fixed frame 102. The movable frame 104 is interposed between the fixed frame 102 and the yoke 106, and attached to the fixed frame 102 with urging force toward the fixed frame 102 by urging springs 108. Three balls 122 are arranged on a rear surface of the movable frame 104. The movable frame 104 is configured to smoothly move on the surface of the fixed frame 102 by the three balls 122.

Figure 3:
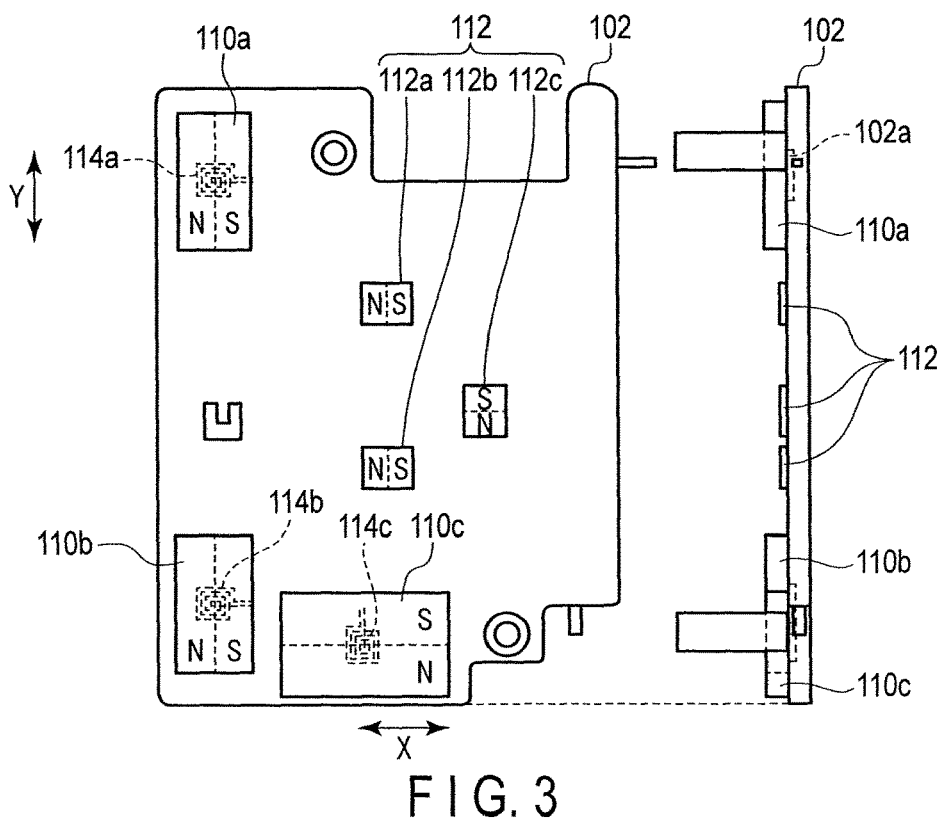
FIG. 3 is a diagram showing a configuration of a fixed frame.

FIG. 3 is a diagram showing a configuration of the fixed frame 102. In FIG. 3, a left part is a front view of the fixed frame 102, and a right part is a side view of the same. As shown in FIG. 3, the fixed frame 102 includes three driving magnets 110a, 110b, and 110c, three position detecting magnets 112, and three detection coils 114a, 114b, and 114c.

The three position detecting magnets 112 (112a, 112b, and 112c) are disposed in positions corresponding to coils indicated by broken lines in a central portion of FIG. 2.

The driving magnet 110a is disposed on an upper left corner in the front surface of the fixed frame 102. The driving magnet 110a includes a first magnet and a second magnet. The first magnet is disposed so that the longitudinal direction coincides with the Y direction, and a north pole faces the movable frame 104. The second magnet is disposed so that the longitudinal direction coincides with the Y direction, and a south pole faces the movable frame 104.

The driving magnet 110b is disposed on a lower left corner in the front surface of the fixed frame 102. The driving magnet 110b includes a first magnet and a second magnet. The first magnet is disposed so that the longitudinal direction coincides with the Y direction, and a north pole faces the movable frame 104. The second magnet is disposed so that the longitudinal direction coincides with the Y direction, and a south pole faces the movable frame 104.

The driving magnet 110c is disposed on a bottom center portion in the front surface of the fixed frame 102. The driving magnet 110c includes a first magnet and a second magnet. The first magnet is disposed so that the longitudinal direction coincides with the X direction, and a north pole faces the movable frame 104. The second magnet is disposed so that the longitudinal direction coincides with the X direction, and a south pole faces the movable frame 104.

The driving magnet 110a and the driving magnet 110b are magnets to drive the movable frame in the X direction in FIG. 3, and the magnet 110c is a magnet to drive the movable frame in the Y direction in FIG. 3.

The three position detecting magnets 112 (112a, 112b, and 112c) are disposed on a central portion of the front surface of the fixed frame 102 as shown in FIG. 3. The three position detecting magnets 112 are preferably apart from drive coils disposed on the movable frame 104 at a distance so as to not be affected by magnetic flux from the drive coils on the fixed frame 102. Magnetic pole direction of the position detecting magnet 112a corresponds to that of the driving magnet 110a. Magnetic pole direction of the position detecting magnet 112b corresponds to that of the driving magnet 110b. Magnetic pole direction of the position detecting magnet 112c corresponds to that of the driving magnet 110c.

A detection coil 114a is disposed in a hole 102a provided in a rear surface of the fixed frame 102 shown in FIG. 3, in a position facing a drive coil (to be described later) with the magnet 110a interposed therebetween. The detection coil 114a is disposed in a position where the center of gravity thereof coincides with the center of gravity of the driving magnet 110a. Similarly, the detection coil 114b is disposed in a position of the rear surface of the fixed frame 102 where the center of gravity thereof coincides with the center of gravity of the driving magnet 110b. Furthermore, the detection coil 114c is disposed in a position of the rear surface of the fixed frame 102 where the center of gravity thereof coincides with the center of gravity of the driving magnet 110c.

Coincidence of the centers of gravity is desirable, but is not necessary. The centers of gravity may be deviated within the margin of error.

Figure 4:
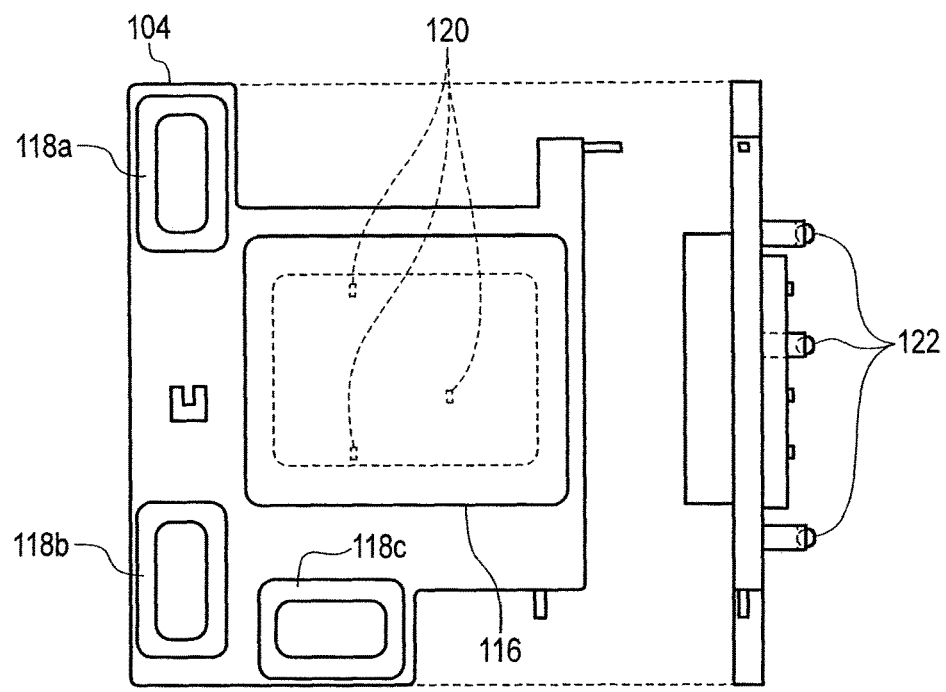
FIG. 4 is a diagram showing a configuration of a movable frame.

FIG. 4 is a diagram showing a configuration of the movable frame 104. In FIG. 4, a left part is a front view of the movable frame 104, and a right part is a side view of the same. As shown in FIG. 4, the movable frame 104 includes an imaging element 116, three drive coils 118a, 118b, and 118c, and three detectors, namely, Hall elements 120.

The imaging element 116 is mounted in an opening in a central portion of the movable frame 104. The imaging element 116 images an object and generates an image signal concerning the object. The imaging element 116 converts an image signal to a digital signal and outputs the digital signal.

The drive coil 118a is disposed on an upper left corner in the front surface of the movable frame 104 so as to correspond to the driving magnet 110a disposed on the fixed frame 102. While the movable frame 104 is not moving relative to the fixed frame 102, the driving magnet 110a is located between the drive coil 118a and the detection coil 114a. Furthermore, while the movable frame 104 is not moving relative to the fixed frame 102, the centers of gravity of the drive coil 118a and the detection coil 114a coincide with each other. Thus, in an initial state, the driving magnet 110a is interposed between the drive coil 118a and the detection coil 114a.

The drive coil 118b is disposed on a lower left corner in the front surface of the movable frame 104 so as to correspond to the driving magnet 110b disposed on the fixed frame 102. While the movable frame 104 is not moving relative to the fixed frame 102, the driving magnet 110b is located between the drive coil 118b and the detection coil 114b. Furthermore, while the movable frame 104 is not moving relative to the fixed frame 102, the centers of gravity of the drive coil 118b and the detection coil 114b coincide with each other. Thus, in the initial state, the driving magnet 110b is interposed between the drive coil 118b and the detection coil 114b.

The drive coil 118c is disposed on a bottom center portion in the front surface of the movable frame 104 so as to correspond to the driving magnet 110c disposed on the fixed frame 102. While the movable frame 104 is not moving relative to the fixed frame 102, the driving magnet 110c is located between the drive coil 118c and the detection coil 114c. Furthermore, while the movable frame 104 is not moving relative to the fixed frame 102, the centers of gravity of the drive coil 118c and the detection coil 114c coincide with each other. Thus, in the initial state, the driving magnet 110c is interposed between the drive coil 118c and the detection coil 114c.

The three Hall elements 120 are disposed to respectively face the position detecting magnets 112. Each of the Hall elements outputs a detection signal in accordance with the magnetic flux coming from the corresponding position detecting magnet 112 as a signal indicative of a position of the movable frame 104 relative to the fixed frame 102.

Figure 5:
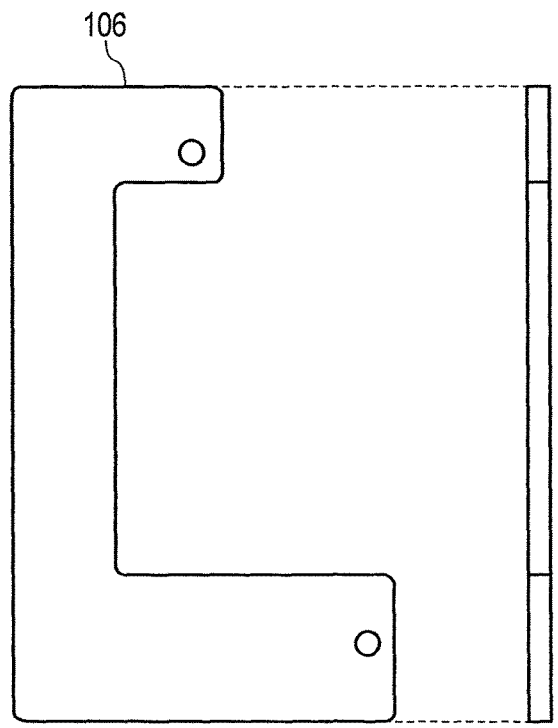
FIG. 5 is a diagram showing a configuration of a yoke.

FIG. 5 is a diagram showing a configuration of the yoke 106. In FIG. 5, a left part is a front view of the yoke 106, and a right part is a side view of the same. As shown in FIG. 5, the yoke 106 has an almost L shape that faces the driving magnets 110a, 110b, and 110c of the fixed frame 102 shown in FIG. 3. The yoke 106 is formed of a ferromagnetic material, such as iron, and forms a magnetic circuit among the magnets 110a, 110b, and 110c. Thus, the yoke 106 functions to increase the magnetic flux that the drive coils 118a, 118b, and 118c receive.

Figure 6:
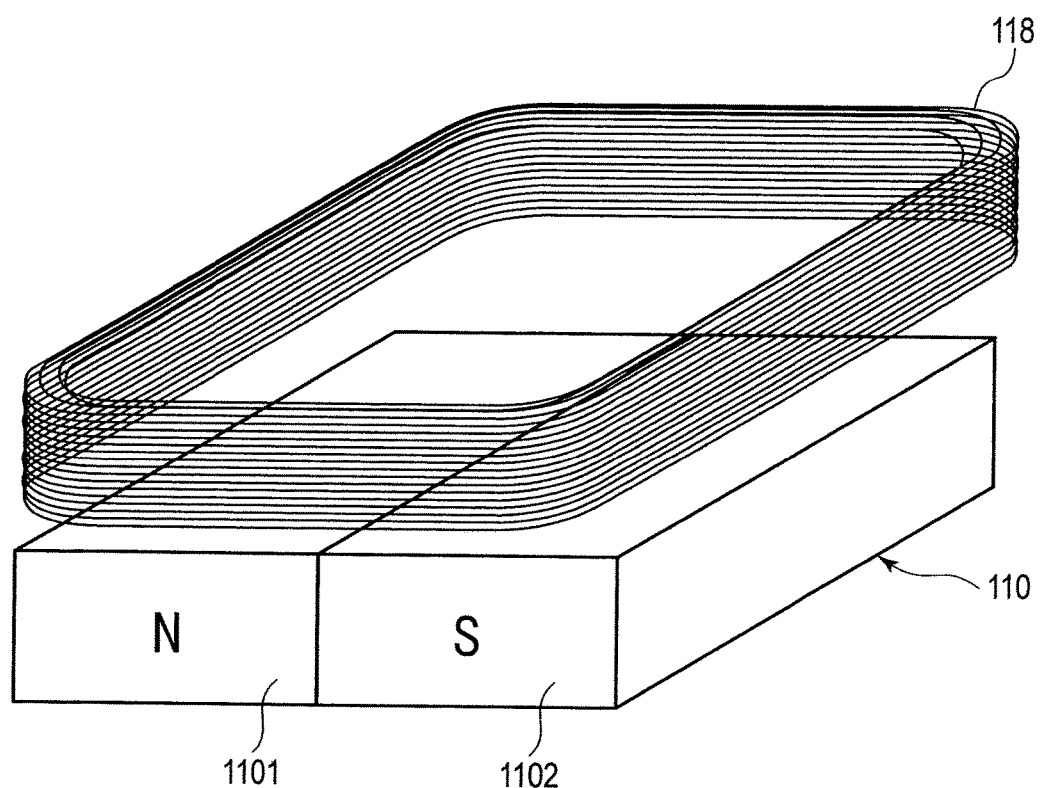
FIG. 6 is a diagram showing a fundamental configuration of a voice coil motor (VCM).

FIG. 6 is a diagram showing a fundamental configuration of a voice coil motor (VCM). FIG. 6 shows a VCM comprised of the driving magnet 110a and the drive coil 118a. A VCM comprised of the magnet 110b and the drive coil 118b and a VCM comprised of the magnet 110c and the drive coil 118c are the same as the VCM comprised of the magnet 110a and the drive coil 118a in a basic configuration, except for a difference in placement of the magnetic poles of the magnets. Therefore, in FIG. 6, the driving magnets 110a, 110b, and 110c are collectively indicated as the magnet 110, and the drive coils 118a, 118b, and 118c are collectively indicated as the drive coil 118. FIG. 6 shows placement of the driving magnet 110 and the drive coil 118 in the VCM in an initial state, when driving has not started, for example, immediately after the power is turned on.

In the initial state, as shown in FIG. 6, the central portion of the winding of the drive coil 118 is placed above a boundary line between the first magnet 1101 and the second magnet 1102 of the driving magnet 110, and in a central position that halves the boundary line.

In the configuration shown in FIG. 6, when the drive coil 118 that receives a magnetic flux from the driving magnet 110 is energized, a magnetic flux and driving force corresponding to the amount and direction of a current flowing through the drive coil 118 are generated. The drive coil 118 moves in accordance with the driving force generated in the drive coil 118.

Though not shown in FIG. 6, when the drive coil 118 moves, the positional relationship between the Hall element 120 and the position detecting magnet 112 changes. Accordingly, the amount of the magnetic flux received by the Hall element 120 changes, and the amount of the detection signal output by the Hall element 120 also changes. A relative position between the position detecting magnet 112 and the Hall element 120 can be detected from the detection signal output by the Hall element 120.

The operations described above are performed for the VCM comprised of the driving magnet 110a and the drive coil 118a, the VON comprised of the driving magnet 110b and the drive coil 118b, and the VCM comprised of the magnet 110c and the drive coil 118c in the same manner. At that time, the movable frame 104 moves or rotates relative to the fixed frame 102 by appropriately setting the amounts of drive currents applied to the drive coils 118a, 118b, and 118c. A position of the movable frame 104 relative to the fixed frame 102 is detected from detection signals output by the Hall elements 120.

Figure 23:
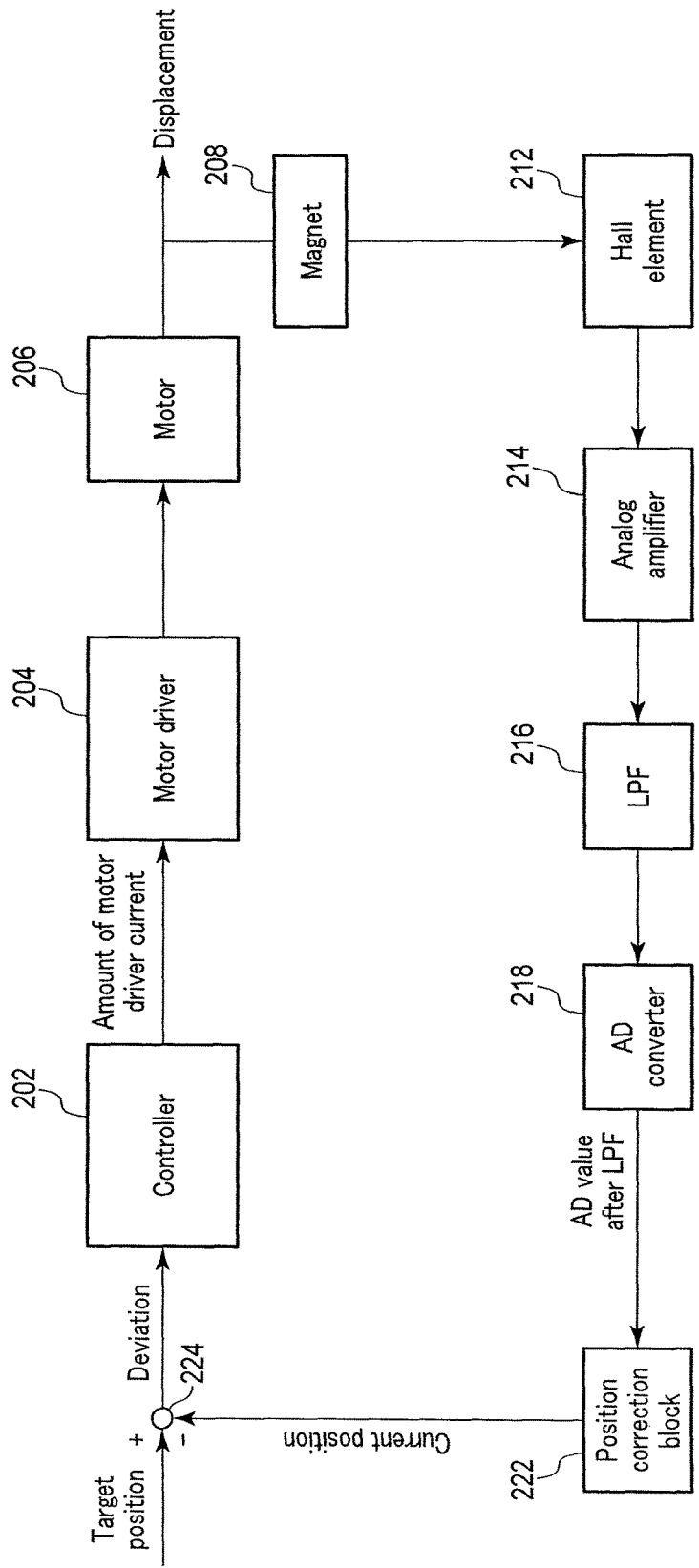
FIG. 23 is a block diagram showing a configuration of a position control system of a camera shake correction unit in an imaging device of prior art.

FIG. 23 is a block diagram showing a configuration of a position control system of a camera shake correction unit 23 in an imaging device 1 of prior art. As shown in FIG. 23, the imaging device 1 includes a controller 202, a motor driver 204, a motor (VCM) 206, a position detecting magnet 208, a Hall element 212, an analog amplifier 214, a low-pass filter (LPF) 216, an AD converter 218, a position correction block 222, and a subtractor 224. A part of these components may be configured by software. The configuration shown in FIG. 23 is provided for each of a number of VCMs, although FIG. 23 shows the configuration for only one of the VCMs. Furthermore, FIG. 23 indicates one of the VCMs (each formed of a drive coil and a driving magnet) in the camera shake correction unit 23 as the motor 206, one of the position detecting magnets 112 as the magnet 208, and one of the Hall elements 120 as the Hall element 212.

The controller 202 is a drive controller that performs feedback control about the position of the movable frame 104 by, for example, PID control. Specifically, the controller 202 includes an IIR filter, performs a filtering process for a deviation signal input from the subtractor 224 to generate a signal indicative of a value of a drive current for driving the motor 206, and outputs the value of the generated drive current to the motor driver 204.

The motor driver 204 displaces the movable frame 104 by applying a drive signal, corresponding to the value of the drive current input from the controller 202, to the motor 206 (actually, the drive coil 118).

The analog amplifier 214 receives a detection signal output from the Hall element 212, and analog-amplifies the received detection signal within an AD conversion range in the AD converter 218.

The LPF 216 performs LPF processing for removing a high-frequency component of the detection signal to suppress aliasing that occurs when a detection signal output from the analog amplifier 214 is AD converted.

The AD converter 218 converts a detection signal output from the LPF 216 to a digital signal.

The position correction block 222 generates a current position signal to perform digital correction to control the movable frame 104 to be located at a correct position based on an AD value input from the AD converter 218. The position correction block 222 outputs the generated current position signal to the subtractor 224. The Hall element 212 or the like has temperature characteristics, and can output different detection signals with respect to the same position of the movable frame 104. The position correction block 222 may also correct an error due to the temperature characteristics or the like by using a temperature sensor (not shown).

In this embodiment, the position correction block 222 performs software processing; however, a part or all of the block may be constituted by an analog circuit.

The subtractor 224 outputs to the controller 202 a deviation signal corresponding to a difference between a drive target position signal indicative of a drive target position of the movable frame 104 input from, for example, the control circuit 26, and a current position signal generated by the position correction block 222. The controller 202 calculates a drive current based on the deviation signal. As a result, the position of the movable frame 104 moves closer to the drive target position.

Figure 7:
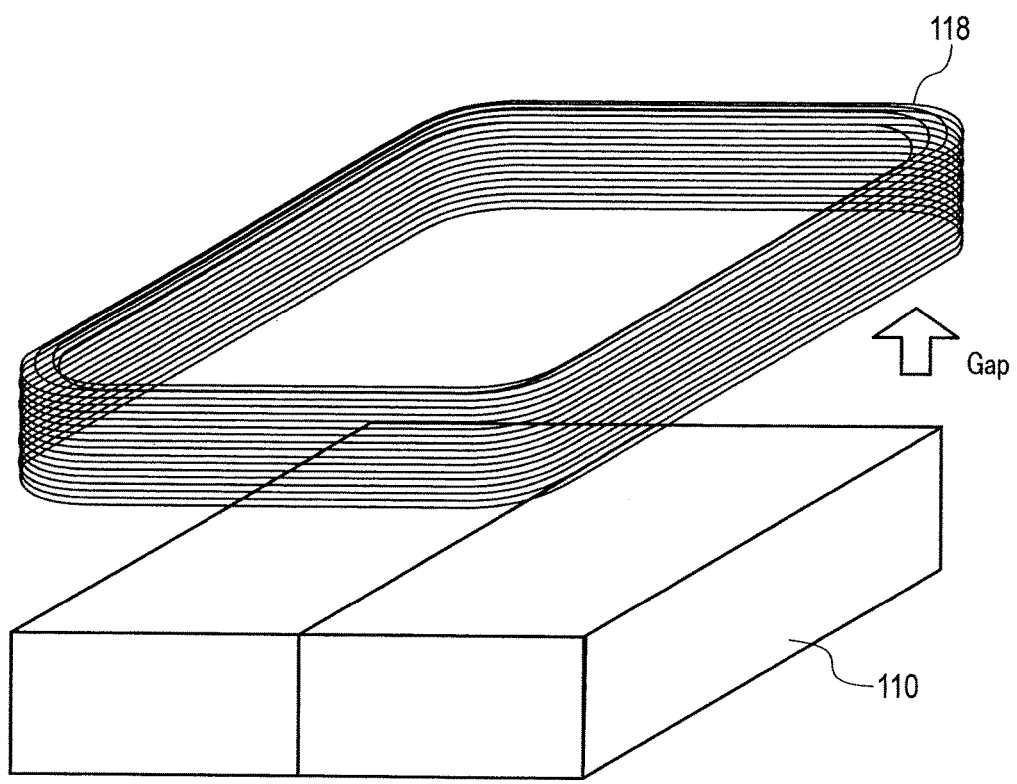
FIG. 7 is a diagram showing a gap misalignment between a fixed frame and a movable frame.

A gap, namely, a distance between the fixed frame 102 and the movable frame 104, may vary due to various factors. If, as shown in FIG. 7, the gap between the fixed frame 102 and the movable frame 104 is not aligned, the amount of the magnetic flux from the driving magnet 110 received by the drive coil 118 will vary. For example, if the distance between the drive coil 118 and the driving magnet 110 increases, the amount of the magnetic flux from the driving magnet 110 received by the drive coil 118 will decrease. Due to the decrease of the magnetic flux, a driving force of the VCM decreases.

Figure 8A:
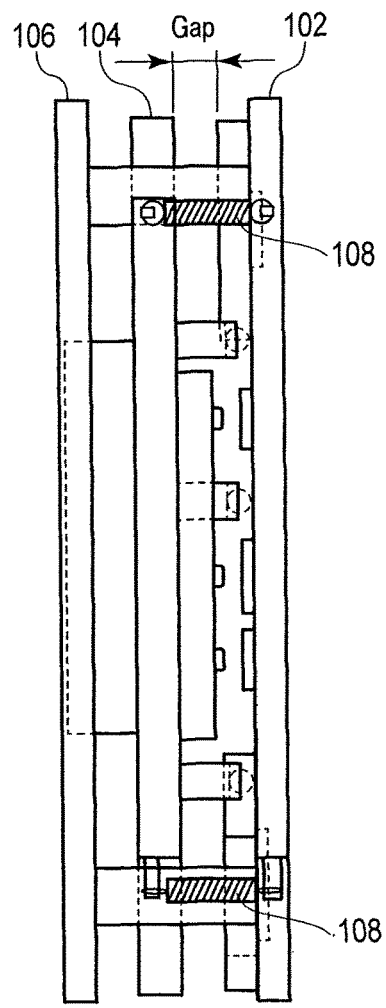
FIG. 8A is a diagram for explaining a gap.
Figure 8B:
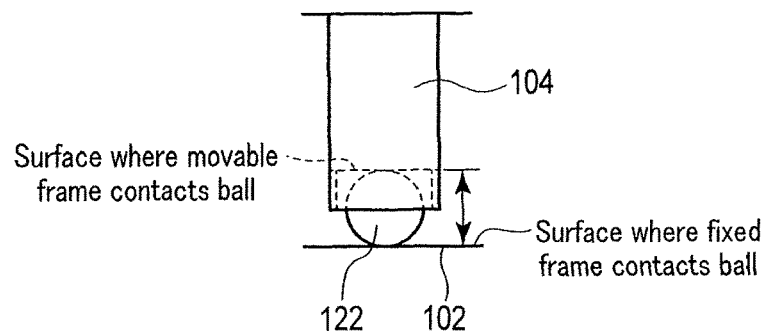
FIG. 8B is a diagram for explaining a gap.

A concept about a gap will be explained below. FIG. 8A illustrates a gap. The fixed frame 102 and the movable frame 104 are disposed to be spaced at a predetermined gap via balls 122 interposed therebetween, and the movable frame 104 is urged toward the fixed frame 102 by the urging springs 108 attached to the fixed frame 102. Thus, the gap is basically configured so that the balls 122 are always in contact with the fixed frame 102 and the movable frame 104 by the urging force of the urging springs 108. Strictly, however, it is difficult to attach the movable frame 104 to the fixed frame 102 in parallel. For example, when the fixed frame 102 and the movable frame 104 are produced, the surface on which the movable frame 104 is in contact with the ball 122 and the surface on which the fixed frame 102 is in contact with the ball 122 may be inclined with respect to each other as shown in FIG. 8B. Because of the inclination, the gap between the fixed frame 102 and the movable frame 104 may be nonuniform from place to place. Since the amount of the gap between the fixed frame 102 and the movable frame 104 is not uniform, the amount of the magnetic flux from the driving magnet 110 received by the drive coil 118 varies. The variance of the magnetic flux appears as a decrease of the driving force.

Figure 9:
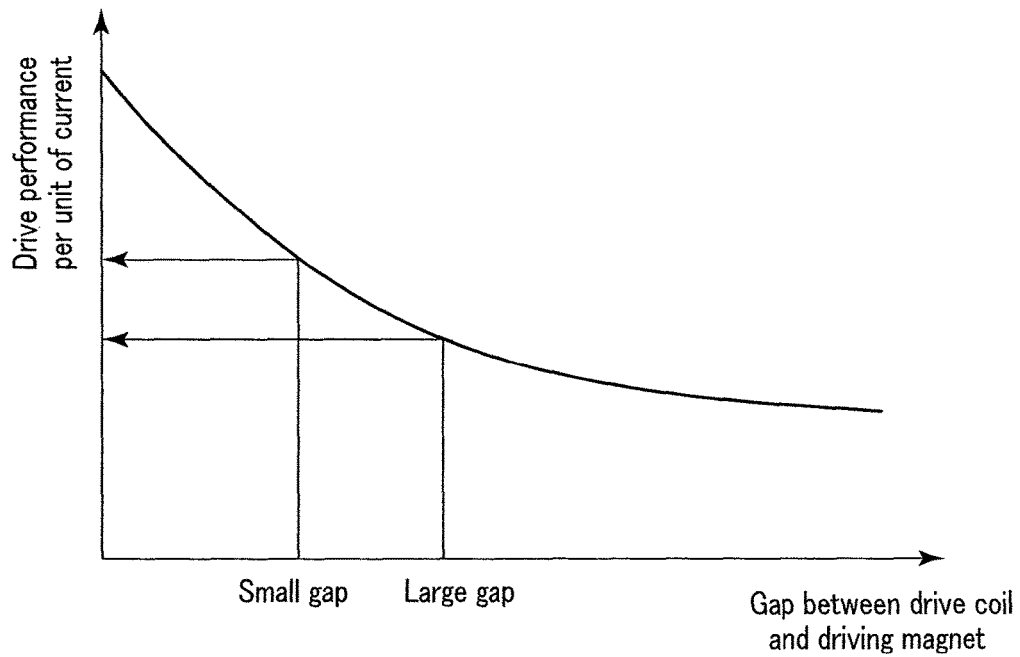
FIG. 9 is a diagram showing a dependence of drive performance per unit of current on a gap.

FIG. 9 is a diagram showing a dependence of drive performance (displacement of the movable frame 104) per unit of current on a gap. The horizontal axis in FIG. 9 represents an amount of a gap between the driving magnet 110 and the drive coil 118. The vertical axis in FIG. 9 represents drive performance per unit of current. As shown in FIG. 9, the greater the amount of the gap between the driving magnet 110 and the drive coil 118, the lower the drive performance.

Figure 10:
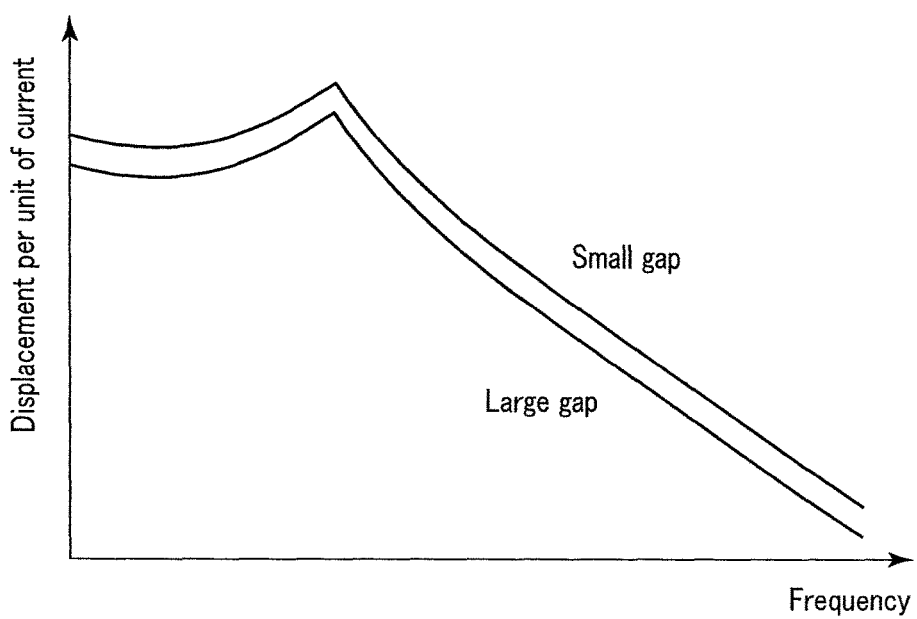
FIG. 10 is a diagram showing a drive characteristic (transmission characteristic) of a motor (VCM).

FIG. 10 is a diagram showing a drive characteristic (transmission characteristic) of the motor (VCM) 206. In FIG. 10, the horizontal axis represents a frequency of a current applied to the drive coil 118, and the vertical axis represents a displacement of the movable frame 104 per unit of current. The characteristic shown in FIG. 10 is represented by a transfer function that is expressed in a formula (1). In the formula (1), X(s)/I(s) represents a displacement (one dimensional) per unit of current, s represents a Laplace operator, an attenuation coefficient, and $\omega_n$ a frequency. The actual displacement of the movable frame 104 also depends on the amplitude of a drive current. Specifically, the actual displacement of the movable frame 104 is a product of the displacement per unit of current and the amplitude of a drive current.

$$\frac{X(s)}{I(s)} = \frac{\omega_n^2}{s^2 + 2\xi\omega_n s + \omega_n^2} \qquad \text{Formula (1)}$$

The relationship between a frequency band and drive performance in the VCM will be explained below.

Generally, the VCM has different drive characteristics respectively in (1) a low-frequency band, (2) a mid-frequency band, and (3) a high-frequency band. In the low-frequency band, the displacement of the movable frame 104 per unit of current is large. In the mid-frequency band, the displacement of the movable frame 104 per unit of current is moderate. In the high-frequency band, the displacement of the movable frame 104 per unit of current is small. In any of the frequency bands, the greater the amount of the gap, the smaller the displacement of the movable frame 104 per unit of current.

Figure 11:
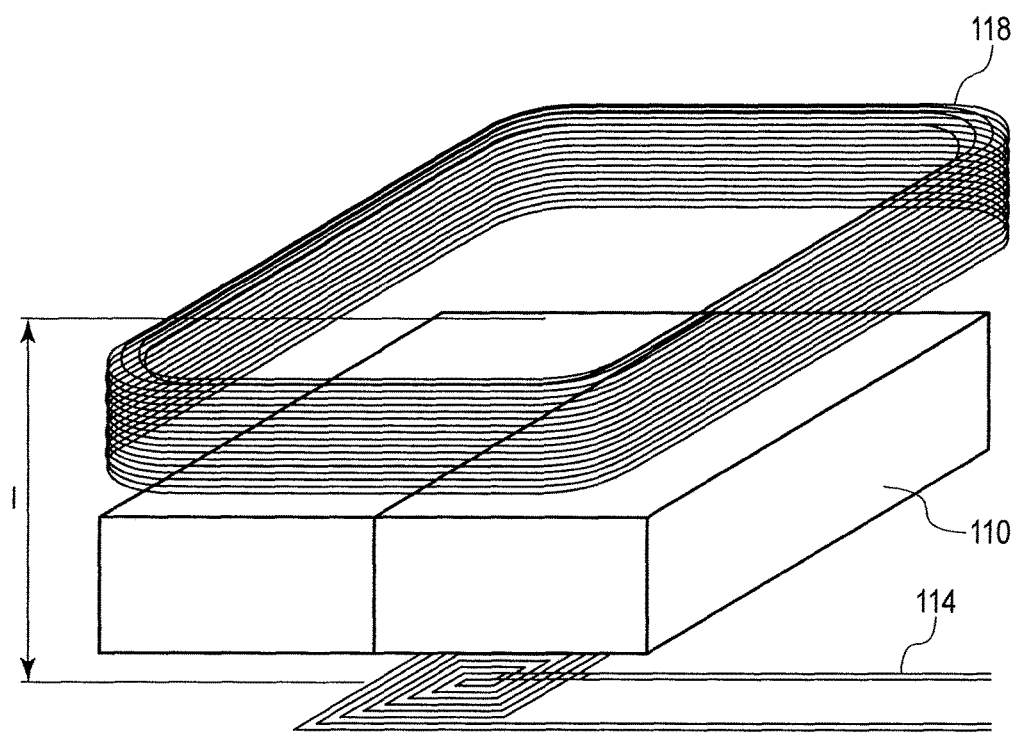
FIG. 11 is a diagram showing a positional relationship between a drive coil and a detection coil in an initial state.

As described above, the reduction of drive performance varies depending on the amount of the gap (distance) between the driving magnet 110 and the drive coil 118. To detect the amount of the gap (distance) between the driving magnet 110 and the drive coil 118, in this embodiment, the detection coil 114 is disposed in a position where the center of gravity thereof coincides with the center of gravity of the drive coil 118, as shown in FIG. 11. The detection coil 114 generates a signal corresponding to the magnetic flux generated in the drive coil 118 by application of a drive current to the drive coil 118.

FIG. 12 is a block diagram showing a configuration of a position control system of the camera shake correction unit 23 of the imaging device 1 according to the embodiment. Configurations that are the same as those shown in FIG. 23 are specified by the same reference symbols as those in FIG. 23, and explanations thereof are omitted as appropriate. In FIG. 12, one of the three detection coils 114 is indicated as a detection coil 226.

The motor driver 204 of this embodiment includes a high frequency superimposing unit 204a. The high frequency superimposing unit 204a includes, for example, a high frequency oscillator, and applies to the motor 206 a drive signal in which a high-frequency drive current (high-frequency drive signal) is superimposed on a drive current corresponding to a drive signal from the controller 202. The high-frequency drive current is a current to measure the gap between the driving magnet 110 and the drive coil 118 by the detection coil 226.

FIG. 13 is a graph showing a relationship between a frequency and a displacement per unit of current in the movable frame 104. As shown in FIG. 13, the VCM has different drive characteristics respectively in (1) a low-frequency band, (2) a mid-frequency band, and (3) a high-frequency band. In the low-frequency band, the displacement of the movable frame 104 per unit of current is large. In the mid-frequency band, the displacement of the movable frame 104 per unit of current is moderate. In the high-frequency band, the displacement of the movable frame 104 per unit of current is small. The motor 206 is driven in accordance with a drive signal from the motor driver 204. Therefore, if an additional drive signal is superimposed on the drive signal corresponding to a drive current value instructed from the controller 202, the additional drive signal may also affect the displacement of the movable frame 104. As shown in FIG. 13, when a signal of a frequency in the high-frequency band (3) is applied to the motor 206, the displacement of the movable frame 104 is negligible. Thus, a frequency in the high-frequency band (3) is preferable as a frequency of the further drive signal to be superimposed on the drive signal corresponding to the drive current value instructed from the controller 202.

Figure 14A:
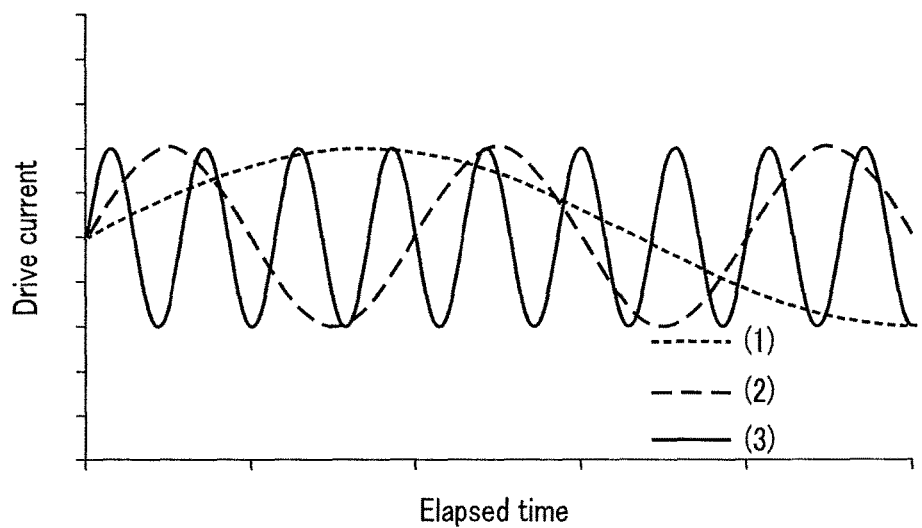
FIG. 14A is a diagram showing (1) a drive current in the low-frequency band, (2) a drive current in the mid-frequency band, and (3) a drive current in the high-frequency band.

FIG. 14A is a diagram showing a relationship between an elapsed time and a drive current in each of (1) the low-frequency band, (2) the mid-frequency band, and (3) the high-frequency band. In this embodiment, (1) the drive current in the low-frequency band is assumed to be several tens of Hz or lower; (2) the drive current in the mid-frequency band is assumed to be from several tens of Hz to 1 kHz; and (3) the drive current in the high-frequency band is assumed to be a value that is higher than 1 kHz and that suppresses the displacement of the movable frame 104 to a range smaller than the pixel pitch (that is, the displacement of the movable frame 104 is negligible). However, since the frequencies in the low, mid, and high frequency bands are relative values, they are not limited to the numerical values mentioned above. In FIG. 14A, amplitudes of the respective drive currents are the same.

Figure 14B:
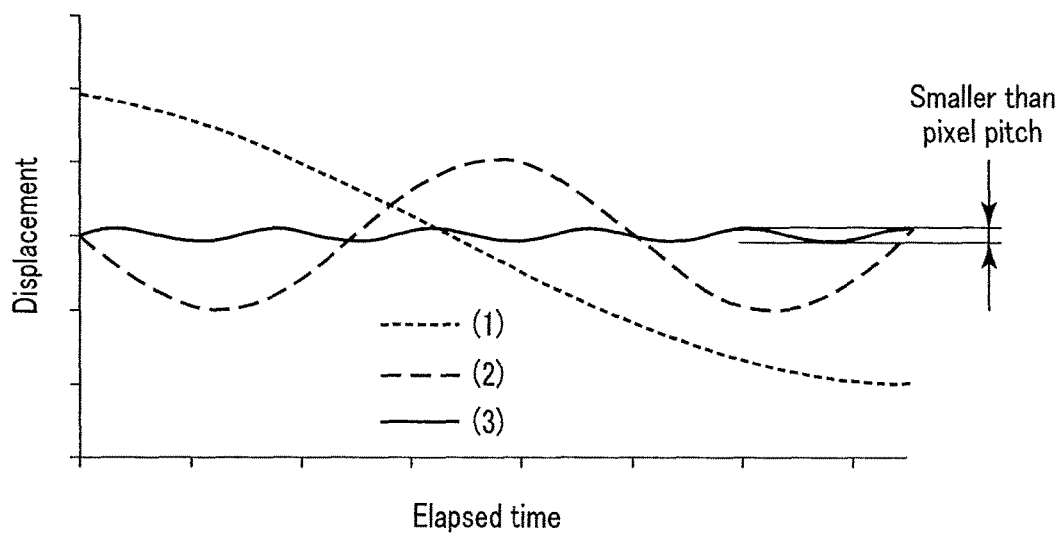
FIG. 14B is a diagram showing displacement of the movable frame when the drive currents shown in FIG. 14A are applied to the motor.

FIG. 14B is a diagram showing displacements of the movable frame 104 that respectively occur when the drive currents in the low, mid and high frequency bands shown in FIG. 14A are applied to the motor 206 (the drive coil 118).

In the low-frequency band, since the displacement per unit of current is large as shown in FIG. 13, when the drive current in the low-frequency band shown in FIG. 14A is applied to the motor 206, a large displacement as shown in FIG. 14B occurs. Similarly, in the mid-frequency band, since the displacement per unit of current is moderate as shown in FIG. 13, when the drive current in the mid-frequency band shown in FIG. 14A is applied to the motor 206, a moderate displacement as shown in FIG. 14B occurs. However, in the high-frequency band shown in FIG. 13, the motor 206 cannot follow the drive current. Therefore, in the high-frequency band, even if the amplitude of the drive current is increased, the displacement is negligible as shown in FIG. 14B. Therefore, even if the drive current having a frequency in the high-frequency band is superimposed on the original drive current, it affects almost nothing on the displacement of the movable frame 104.

As described above, "the high frequency" in this embodiment is preferably a frequency in which the displacement of the movable frame 104 does not affect an image produced via the imaging element 116. Specifically, "the high frequency" in this embodiment is preferably a frequency in which the displacement of the movable frame 104 falls within a range of one pixel of the imaging element 116.

Referring back to FIG. 12, in this embodiment, the motor driver 204 applies the drive current on which the high-frequency drive current is superimposed to the motor 206. Upon receipt of a magnetic flux from the drive coil 118, the detection coil 226 outputs a signal corresponding to the magnetic flux coming from the drive coil 118.

The signal output from the detection coil 226 is input to the high frequency detection unit 228. FIG. 15 shows a configuration of an example of the high frequency detection unit 228. As shown in FIG. 15, the high frequency detection unit 228 includes a band-pass filter (BPF) 228a and an AD converter 228b. The BPF 228a is a filter to which a frequency characteristic is set to allow passage of a signal having a frequency of the high-frequency drive current as shown in FIG. 16. In other words, the BPF 228a acquires, from the output of the detection coil 226, a predetermined high-frequency signal corresponding to the frequency of the high-frequency drive current superimposed on a low-frequency wave or a mixed wave of a low-frequency wave and a mid-frequency wave. The AD converter 228b converts the high-frequency signal output from the BPF 228a to a digital signal. The AD converter 228b outputs an AD value of the high-frequency signal to the controller 202.

Figure 17:
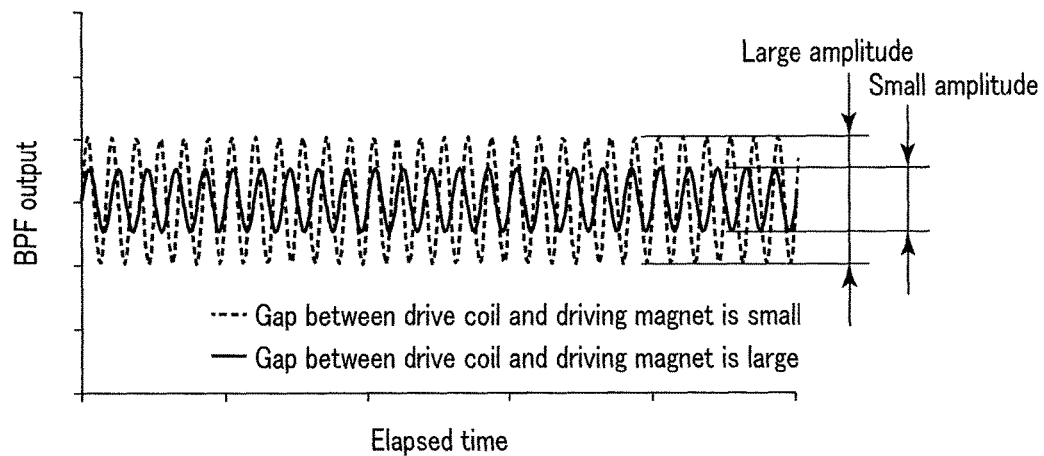
FIG. 17 is a diagram showing a relationship between a BPF output and a distance from a magnet to a drive coil.

FIG. 17 is a diagram showing an output of the BPF 228a. The high-frequency signal passed through the BPF 228a does not depend on a change in the magnetic flux in accordance with the displacement of the movable frame 104. It depends on a magnetic flux that occurs in the drive coil 118 when the high-frequency drive current that makes the displacement of the movable frame 104 smaller than the pixel pitch is superimposed on the drive current and applied to the drive coil 118. As described above, the magnetic flux received by the drive coil 118 from the driving magnet 110 decreases as the gap between the drive coil 118 and the driving magnet 110 increases. Due to the decrease of the magnetic flux from the drive coil 118, the amplitude of the signal output from the detection coil 226 decreases. Therefore, as shown in FIG. 17, the amplitude of the high-frequency signal output from the BPF 228a is small when the gap between the drive coil 118 and the driving magnet 110 is large, and large when the gap between the drive coil 118 and the driving magnet 110 is small.

Figure 18:
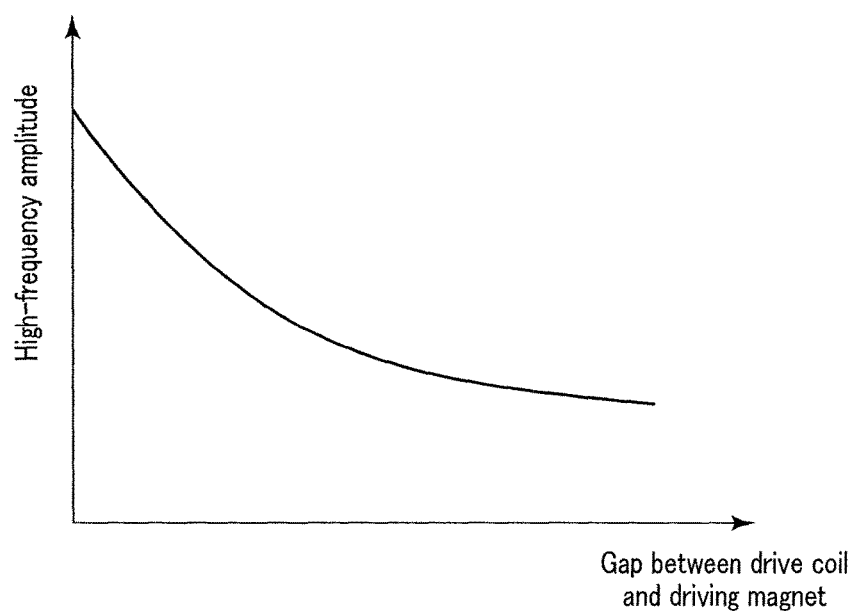
FIG. 18 is a diagram showing a dependence of a high-frequency signal component of an output from the detection coil on a gap between the drive coil and the driving magnet.

FIG. 18 is a diagram showing a dependence of a high-frequency signal component of the output from the detection coil 226 (an output of the BPF 228a) on a gap between the drive coil 118 and the driving magnet 110. As described above with reference to FIG. 17, the greater the gap, the smaller the amplitude of the high-frequency signal component of the output of the detection coil 226 (the output of the BPF 228a). In other words, the output of the detection coil 226 can be considered as a distance-equivalent value equivalent to the distance between the detection coil 226 and the drive coil 118. Both the detection coil 226 and the driving magnet 110 are disposed on the fixed frame 102, and their relative positions are not variable. Accordingly, the output from the detection coil 226 can be considered as a distance-equivalent value equivalent to the distance between the driving magnet 110 and the drive coil 118. Therefore, even if a misalignment of the gap between the drive coil 118 and the driving magnet 110 occurs, the drive signal can be corrected so as to not lower the drive performance of the motor 206 by estimating a gap between the drive coil 118 and the driving magnet 110 based on the output of the detection coil 226, and correcting the driving force by the controller 202 in accordance with the estimated gap.

The configurations shown in FIG. 12 are the same as those shown in FIG. 23 except for those described above. Therefore, explanations thereof are omitted.

Figure 19:
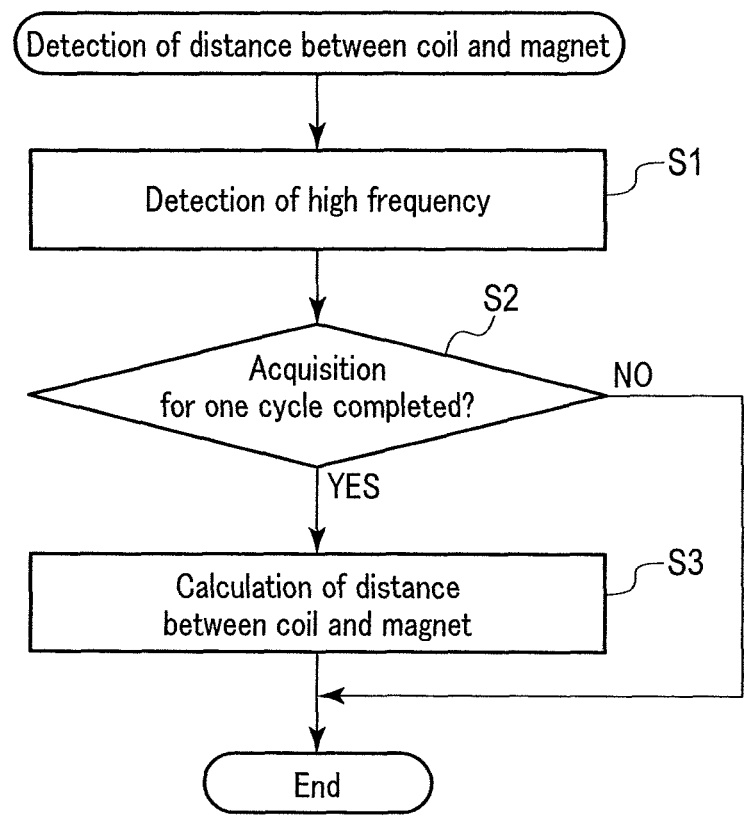
FIG. 19 is a flowchart showing a process for calculating a distance between the drive coil and the driving magnet.

A method for calculating a distance between the drive coil and the driving magnet in this embodiment will be described below. FIG. 19 is a flowchart showing a process for calculating a distance between the drive coil and the driving magnet. The processing of FIG. 19 is executed at a frequency of twice or higher than the frequency of the high-frequency drive current. This is because the sampling frequency of the AD converter 228b must be twice or higher than the frequency of the high-frequency drive current in order to correctly AD convert the high-frequency component of the detection signal by the AD converter 228b.

In step S1, the high frequency detection unit 228 detects a high-frequency component of the signal output from the detection coil 226. More specifically, in the high frequency detection unit 228, the BPF 228a acquires a high-frequency component corresponding to the frequency of the high-frequency drive current in the input signal, and the AD converter 228b converts the acquired high-frequency component to a digital signal and outputs the digital signal to the controller 202.

In step S2, the controller 202 determines whether or not acquisition of the high-frequency component for one cycle has been completed. If it is determined that acquisition of the high-frequency component for one cycle has not been completed in step S2, the processing is ended. If it is determined that acquisition of a high-frequency component for one cycle has been completed in step S2, the processing proceeds to step S3.

In step S3, the controller 202 calculates the distance between the drive coil 118 and the driving magnet 110. Then, the processing is ended. As described above, the amplitude of the high-frequency signal output from the high frequency detection unit 228 varies in accordance with the distance between the drive coil 118 and the detection coil 226; that is, since the detection coil 226 and the driving magnet 110 are both disposed on the fixed frame 102, the amplitude varies in accordance with the distance between the drive coil 118 and the driving magnet 110. Accordingly, the distance between the drive coil 118 and the driving magnet 110 can be calculated from the amplitude of the high-frequency signal output from the high frequency detection unit 228 by obtaining a relationship between an amplitude of the high-frequency signal, and a gap between the drive coil 118 and the driving magnet 110 shown in FIG. 18, by simulation or the like and storing the relationship in the controller 202.

Operations of the position control system shown in FIG. 12 will be described below. FIG. 20 is a flowchart of feedback control in the position control system shown in FIG. 12. During the processing shown in FIG. 20, the processing for calculating a distance shown in FIG. 19 is performed. The processing of FIG. 20 need not be performed at such a high speed as in the processing of FIG. 19. The processing of FIG. 19 may be performed at a frequency used for driving of the motor 206.

In step S11, the subtractor 224 acquires a target position signal. The target position signal is input to the subtractor 224 from, for example, the control circuit 26. For example, the target position signal is set in accordance with the amount of camera shake.

In step S12, the subtractor 224 acquires a current position signal. For this purpose, the current position calculation processing is performed. In the current position calculation processing, the detection signal output from the Hall element 212 is amplified by the analog amplifier 214 and input to the LPF 216. After the LPF processing in the LPF 216, the detection signal is converted to a digital signal by the AD converter 218. The AD value after the LPF processing is input to the position correction block 222. The position correction block 222 corrects an error due to a temperature characteristic or the like in the corrected AD value, and generates a current position signal. The subtractor 224 acquires the current position signal generated in the position correction block 222. The detection signal is affected by the high-frequency drive signal. The component of the high-frequency drive signal in the detection signal is removed while the detection signal is passing through the LPF 216.

In step S13, the subtractor 224 calculates a deviation between the target position and the current position. The deviation signal output from the subtractor 224 is input to the controller 202.

In step S14, the controller 202 generates a drive signal indicative of a value of a drive current to be input to the motor driver 204 to drive the motor 206 from the deviation signal and the AD value of the amplitude of the high-frequency signal that is output from the high frequency detection unit 228 after the BPF processing. The processing in step S14 will be explained later.

In step S15, the controller 202 inputs the drive signal to the motor driver 204. As a result, the amount of the drive current in the motor driver 204 is set, and the motor 206 (actually, the drive coil 118) is driven in accordance with the amount of the drive current. The feedback control shown in FIG. 20 is repeated, so that the movable frame 104 reaches the target position.

Next, the processing of calculating a value of the drive current of the motor driver 204 in step S14 will be explained. FIG. 21 is a flowchart showing a process for calculating a value of the drive current of the motor driver 204.

In step S21, the controller 202 generates a drive signal indicative of a value of the drive current by performing a filtering process for the deviation signal.

In step S22, the controller 202 corrects the drive signal. Then, the processing is ended.

Figure 22:
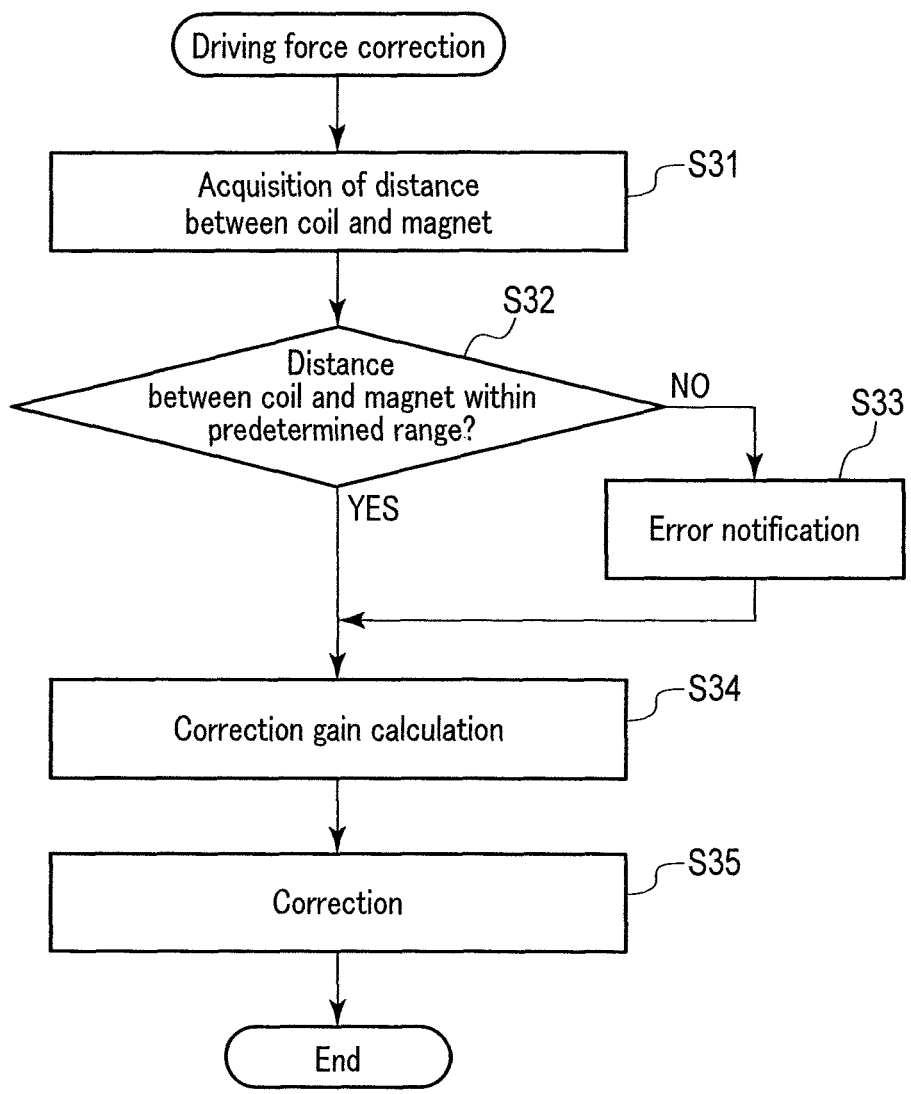
FIG. 22 is a flowchart of a process for correcting a drive signal.

The processing of correcting the drive signal in step S22 will be explained in detail using the flowchart shown in FIG. 22.

In step S31, the controller 202 acquires a value of the distance between the drive coil 118 and the driving magnet. In step S31, the latest one of the values of the distance successively calculated as a result of the processing of FIG. 19 is acquired.

In step S32, the controller 202 determines whether or not the value of the distance between the drive coil 118 and the driving magnet falls within a predetermined range. If it is determined that the value of the distance does not fall within the predetermined range in step S32, the processing proceeds to step S33. If it is determined that the value of the distance falls within the predetermined range in step S32, the processing proceeds to step S34.

Generally, the misalignment of the gap between the fixed frame 102 and the movable frame 104 varies within a certain range. Therefore, when the acquired value of the distance is too large or too small, it is considered that a malfunction of the motor 206 or the like may have occurred. In such a case, the processing proceeds to step S33, and the controller 202 makes an error notification using, for example, the monitor 24. After the error notification, the processing proceeds to step S34. The error notification includes a message to the effect that, for example, a camera shake correction cannot be performed or a drive current correction cannot be performed. Furthermore, the feedback control itself may be stopped in step S33. In this case as well, it is desirable to make an error notification.

In step S34, the controller 202 calculates a correction gain to correct the drive signal. The correction gain is calculated from, for example, the relationship between performance per unit of current and a gap between the drive coil 118 and the driving magnet 110 shown in FIG. 9. For example, an inverse function of the function representing the relationship of FIG. 9 may be considered as the correction gain.

In step S35, the controller 202 corrects the drive signal calculated through the filtering by multiplying the drive signal by the correction gain. Then, the processing is ended.

As described above, according to this embodiment, deterioration of the drive performance of the motor 206 due to gap misalignment between the drive coil 118 and the driving magnet 110 can be corrected by measuring the distance between the drive coil 118 and the driving magnet 110 with the detection coil 226.

In the embodiment, the frequency of the high-frequency drive current is a frequency in which the displacement of the movable frame 104 falls within a range of one pixel of the imaging element 116. Because of this frequency, the image quality is not affected by superimposing the high-frequency drive current on the drive current.

Although the present invention has been described based on the embodiment, the invention is not limited to the embodiment, and various modifications or applications may be made without departing from the spirit or scope of the general inventive concept of the present invention. For example, the configuration of the camera shake correction unit 23 described above is a mere example, but can be modified as appropriate. For example, the VCM may have a different configuration. In the example described above, the driving magnets are disposed on the fixed frame and the drive coils are disposed on the movable frame. Instead, the driving magnets may be disposed on the movable frame and the drive coils may be disposed on the fixed frame. In this case, the detection coils are provided on the movable frame. Furthermore, the camera shake correction unit 23 may be configured to move the optical system 11 instead of the imaging element 116. Moreover, the camera shake correction unit 23 may be used for a purpose other than the camera shake correction processing. For example, the camera shake correction unit 23 may be used for super-resolution processing.

Each of the processes of the embodiment described above may be stored as a program that can be executed by the CPU or the like as a computer. Alternatively, that can be stored and distributed in a storage medium of an external storage device, such as a memory card, a magnetic disk, an optical disk, and a semiconductor memory. The CPU or the like can read the program stored in the storage medium of the external storage device, and controls operations in accordance with the read program, so that the processing described above can be executed.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive device comprising:
    a fixed frame on which one of a drive coil and a magnet facing the drive coil is disposed;
    a movable frame on which another one of the drive coil and the magnet is disposed and which is movable relative to the fixed frame;
    a detector that is disposed on one of the fixed frame and the movable frame on which the drive coil is disposed, and that detects and outputs a detection signal corresponding to a magnetic flux of the magnet;
    a detection coil that is disposed on one of the fixed frame and the movable frame on which the magnet is disposed, and in a position facing the drive coil with the magnet interposed; and
    a drive controller that controls a drive signal on which a high-frequency drive signal is superimposed on a drive current to drive the movable frame and which is to be applied to the drive coil, and that drives the movable frame to a predetermined position based on the detection signal detected by the detector and a high-frequency signal of a predetermined frequency band including a frequency of the high-frequency drive signal that is generated in the detection coil when the drive signal is applied to the drive coil.

2. The drive device according to claim 1, wherein the drive controller acquires an amplitude of the predetermined frequency band including the frequency of the high-frequency drive signal from the high-frequency signal, calculates a distance-equivalent value equivalent to a distance between the detection coil and the drive coil based on the acquired amplitude, and corrects the drive signal to be applied to the drive coil based on the calculated distance-equivalent value.

3. The drive device according to claim 2, wherein the drive coil and the detection coil are disposed so that a center of gravity of the drive coil coincides with a center of gravity of the detection coil.

4. The drive device according to claim 2, further comprising: an imaging element that is disposed in the movable frame and that generates a video signal relating to an object; and a display unit that displays an image based on the video signal, wherein
    the drive controller causes the display unit to display an error notification that the drive signal to be applied to the drive coil is uncorrectable when the distance-equivalent value is outside a predetermined range.

5. A method for controlling a drive device comprising: a fixed frame on which one of a drive coil and a magnet facing the drive coil is disposed; a movable frame on which another one of the drive coil and the magnet is disposed and which is movable relative to the fixed frame; a detector that is disposed on one of the fixed frame and the movable frame on which the drive coil is disposed, and that detects and outputs a detection signal corresponding to a magnetic flux of the magnet; and a detection coil that is disposed on one of the fixed frame and the movable frame on which the magnet is disposed, and in a position facing the drive coil with the magnet interposed, the method comprising:
    applying to the drive coil a drive signal on which a high-frequency drive signal is superimposed on a current that drives the movable frame;
    acquiring an amplitude of a predetermined frequency band including a frequency of the high-frequency drive signal from a high-frequency signal of the predetermined frequency band including the frequency of the high-frequency drive signal that is generated in the detection coil;
    calculating a distance-equivalent value equivalent to a distance between the detection coil and the drive coil based on the acquired amplitude;
    correcting the drive signal to be applied to the drive coil based on the calculated distance-equivalent value; and
    driving the movable frame to a predetermined position by applying the corrected drive signal to the drive coil.

* * * * *